Patented Dec. 7, 1948

2,455,731

UNITED STATES PATENT OFFICE 2,455,731

RESINOUS CONDENSATES OF β-PROPIONOLACTONE AND POLYHYDROXY COMPOUNDS

John R. Caldwell, Kingsport, Tenn., assignor to Eastman Kodak Company, Rochester, N. Y., a corporation of New Jersey No Drawing. Application September 10, 1947, Serial No. 773,291

15 Claims. (Cl. 260—2)

This invention relates to a process for preparing new synthetic polymers. More specifically, this invention concerns a process for preparing new synthetic polymers by reacting β-propionolactone with a polyhydric alcohol.

It is known that β-lactones react with monohydric alcohols to produce β-alkoxy carboxylic acids which may be converted to an α, β-unsaturated carboxylic acid ester, as shown by Kung in U. S. Patent 2,352,641, dated July 4, 1944. It is also known that β-lactones may be readily polymerized to thick, viscous, semi-solid polymers which may subsequently be hydrolyzed and dehydrated to produce α, β-unsaturated carboxylic acids, as shown by Kung in U. S. Patent 2,361,036, dated October 24, 1944. I have now found that β-propionolactone may be reacted with polyhydric alcohols having 2 to 6 free hydroxyl groups to produce valuable polymers which may be readily adapted to forming films, incorporated with cellulose esters, cellulose ethers, vinyl polymers, and the like. Other β-lactones, similar in structure to β-propionolactone, are not suitable for preparing the resinous polymers of my invention. It was therefore most unexpected to find that β-propionolactone alone gave valuable polymers when reacted with a polyhydric alcohol. Although the mechanism of the condensation has not been fully investigated, it appears that β-propionolactone undergoes some peculiar form of rearrangement or molecular orientation which is not shown by the higher members of the β-lactone series.

It is, therefore, an object of this invention to provide a process for preparing new synthetic polymers. Other objects will become apparent hereinafter.

In accordance with my invention, I prepare these new synthetic polymers by reacting β-propionolactone with a polyhydric alcohol.

Generally, any alcohol having two or more free hydroxyl or OH groups may be utilized in my process. An alcohol, as used herein, is intended to define an organic compound having OH groups attached to carbon atoms having no benzenoid unsaturation bonded thereto. In other words, phenols such as resorcinol, etc., do not come within the scope of the term "alcohol" as used herein. Polyhydric alcohols which may be employed are ethylene glycol, diethylene glycol, polyethylene glycols, propylene glycol, dipropylene glycol, polypropylene glycols, butylene glycols, 1 2-propylene glycols, hexanediol-1,4, glycerine, diglycerine, pentaerythritol, polypentaerythritols, sorbitol, mannitol, glucose, and the like. In addition, partial ethers of these glycols may be used to advantage. Examples are glycerine monomethyl ether, glycerine monobutyl ether, sorbitol dibutyl ether, mannitol triethyl ether, and the like. Partial esters of polyhydric alcohols may also be used, provided there are at least two free hydroxyl groups present. For example, glycerine monoacetate, glycerine monopropionate, glycerine monobutyrate, glycerine monostearate, pentaerythritol diacetate, pentaerythritol dibutyrate, sorbitol mono-oleate, sorbitol dioleate, sorbitol trioleate, mannitol diacetate, mannitol dilourate, and the like. Mixed ether-esters may also be utilized in my invention. Examples are sorbitol monomethyl ether diacetate, pentaerythritol monomethyl ether monoacetate, sorbitol monobutyl ether distearate, and the like.

Usually a two-step process is employed in preparing my new thermosetting resins. First, the β-propionolactone is condensed with a polyhydric alcohol, preferably in the presence of a solvent for the reactants, at a temperature of 70–100° C. The solvent is then removed by distillation, and the resulting product is heated with approximately 0.1% by weight, based on the β-propionolactone-polyhydric alcohol condensation product, of a mineral acid catalyst, at a temperature of 110–170° C. to produce an insoluble, infusible resin. It may be advantageous to employ a polymerization catalyst such as benzoyl peroxide, acetyl peroxide, or ultraviolet or actinic light in order to promote the velocity and extent of reaction. While the instant process has been described as an essentially two-step process, it is to be understood that my new resins may be produced by combining these two steps into a single step. However, this mode of procedure is difficult to control, and for practical purposes I prefer to use a two-step process, as described above.

Advantageously my process may be carried out in the presence of a solvent for the β-propionolactone and polyhydric alcohol and which is relatively inert to the reactants. Suitable solvents include the dialkyl ethers which are ordinarily liquid at 10° C.; e. g., diethyl ether, ethyl isopropyl ether, diisopropyl ether, ethyl n-butyl ether, methyl propyl ether, etc.; cyclic ethers which are liquid at 10° C., e. g. 1,4-dioxane; chlorinated hydrocarbons which are liquid at 10° C., e. g. chloroform, carbon tetrachloride, ethylidene dichloride, ethylene dichloride, etc.; and hydrocarbons which are liquid at 10° C., e. g. benzene, toluene, xylene, etc. Although it is not necessary to employ a solvent in the first step of condensation, it is generally preferred to do so due to the exothermic nature of the reaction. Where no solvent is used, artificial cooling means must be employed in order to regulate the reaction.

Relatively strong acids such as sulfuric, perchloric, phosphoric, toluene sulfonic, and alkyl phosphoric acids may conveniently be employed in the second step of my process.

The time required for the second step of my process is approximately 10 to 180 minutes, depending upon the temperature, catalyst, and nature of the resin formed, etc.

The amount of acid catalyst is approximately 0.1% to 0.4% by weight, based on the product being heated. Smaller amounts, usually from 0.05 to 0.1% by weight, of a polymerization auxiliary catalyst may be used.

Generally, I use at least one molecular equivalent of $\beta$-proprionolactone for each available free hydroxyl group in the polyhydric alcohol. For example, when $\beta$-propionolactone is condensed with glycerine, 3 mols. of $\beta$-propionolactone are used for each mol. of glycerine. It is not essential, however, that all available hydroxyl groups in the polyhydric alcohol be reacted with the $\beta$-propionolactone. It is preferred in actual practice to use a mol. ratio of 0.5 to 1.5 of $\beta$-propionolactone for each available hydroxyl group in the polyhydric alcohol, and since the number of free hydroxyl groups is from 2 to 6, this gives an over-all mol. ratio of 1.0 to 9 for each mol. of polyhydric alcohol. A more restricted or preferred range is 1.0 mol. of $\beta$-propionolactone for each available hydroxyl group in the polyhydric alcohol.

The temperature of the first step of the condensation is usually determined by type of reactants, solvents, etc. Generally, I prefer to use a temperature of 70–100° C. The second step, or as will be referred to for convenience as the "curing" step, may likewise be performed at temperatures suitable to the reactants; however, for practical purposes I prefer to use a temperature of 110–170° C.

Prior to curing, pigments or fillers, such as titanium dioxide, carbon black, barium sulfate, ferric oxide, cotton fibers, etc., may be incorporated into the viscous resin resulting from the first step. Bodying agents such as glyptal resins and drying oils may also be added prior to curing. It is also possible to incorporate unsaturated organic compounds in the mixture resulting from the first heating period to produce still other types and varieties of resins. Generally, I prefer to use unsaturated polymerizable compounds which boil at relatively high temperatures since the second or "curing" step is performed at temperatures which would cause a loss of low boiling compounds, i. e., those boiling below approximately 150° C. at atmospheric pressure. It is possible to use these lower boiling compounds, however, provided elevated pressures are maintained to prevent evaporation. It is thus possible to use these high temperatures even though the unsaturated organic compound may boil at the temperature employed if atmospheric pressure were used. The unsaturated organic compounds which I employ in the second step of my process contain the group:

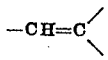

Included within this formula are the acrylates, methacrylates, fumarates, maleates, vinyl esters, and alkenyl nitriles, although other less preferred compounds may be used. The acrylates and methacrylates which I use may be represented by the formula:

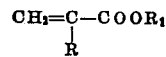

wherein R represents a hydrogen atom or a methyl group, and $R_1$ represents an alkyl group having the formula $C_nH_{2n+1}$ where $n$ is a positive integer from 1 to 8 or an aralkyl group of the benzene series having 7 to 10 carbon atoms. Typical esters embraced by the above formula are methyl, ethyl, propyl, isopropyl, butyl, secondary and tertiary butyl, amyl, 2-ethylbutyl, 2-ethylhexyl, benzyl, $\beta$-phenylethyl, and p-methylbenzyl acrylates or methacrylates. Other acrylic or methacrylic esters which may be used have the formula:

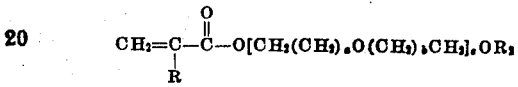

where R is hydrogen or methyl, $R_2$ is hydrogen, an alkyl group such as methyl, ethyl, propyl, butyl, i. e. an alkyl group having the formula $C_nH_{2n+1}$ where $n$ is a positive integer from 1 to 4, an aralkyl group such as benzyl, $\beta$-phenylethyl, etc. or an acyl group such as acetyl, propionyl, butyryl, valeryl, acrylyl, methacrylyl, etc., and $a$, $b$, and $c$ each represents a positive integer from 1 to 4. Typical of the esters represented by the above formula are ethylene diacrylate, ethylene dimethacrylate, diethylene glycol diacrylate, diethylene glycol dimethacrylate, propylene diacrylate, propylene dimethacrylate, dipropylene glycol diacrylate, acrylic acid ester of the monomethyl ether of ethylene glycol, methacrylic acid ester of the monobutyl ether of diethylene glycol, acetate acrylate of butylene glycol, etc. Other esters of acrylic or methacrylic acids which may be used are unsaturated esters such as allyl, methallyl, crotyl, etc. acrylates or methacrylates.

Still other unsaturated copolymerizable compounds which I may use are esters of maleic or fumaric acids. Such esters as the methyl, ethyl, propyl, butyl, amyl, hexyl 2-ethylbutyl, 2-ethylhexyl, benzyl, or $\beta$-phenylethyl esters may be used, i. e. esters having the formula:

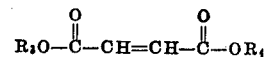

wherein $R_3$ and $R_4$ each represents an alkyl group, having the formula $C_nH_{2n+1}$ where $n$ is a positive integer from 1 to 8, or an aralkyl group. Other esters of fumaric or maleic acids which may be used are polyhydric alcohol esters or their derivative. The alcohols from which these esters may be derived have the formula:

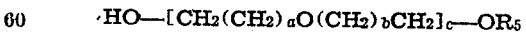

where $R_5$ represents hydrogen, an alkyl group such as methyl, ethyl, propyl, and butyl, i. e., an alkyl group having the formula $C_nH_{2n+1}$ where $n$ is a positive integer from 1 to 4, an aralkyl group such as benzyl, $\beta$-phenylethyl, or an acyl group such as acetyl, propionyl, butyryl, acrylyl, methacrylyl, fumaryl, or maleyl, etc., and $a$, $b$, and $c$ have the above designated definition. Typical esters of fumaric or maleic acid which may be used are diethyl maleate, dibutyl fumarate, fumaric acid-diethylene glycol linear polyester, monoethyl maleic-diethylene glycol linear polyester, acetate-fumarate of diethylene glycol, etc.

Nitriles of unsaturated organic compounds may also be copolymerized with the $\beta$-lactonepolyhydric alcohol polymerizate. Examples of such nitriles are acrylic nitrile, fumaric nitrile, maleic nitrile, methacrylic nitrile, i. e., a nitrile of an aliphatic unsaturated carboxylic acid having the formula:

$$R_t-CH=C(R)-CN$$

where $R_s$ represents a hydrogen atom, an alkyl group, or a cyano group and R represents a hydrogen atom or methyl group.

Vinyl esters may also be used as the unsaturated organic compounds with which the β-lactone-polyhydric alcohol polymerizate is copolymerized. Such esters are vinyl acetate, vinyl propionate, vinyl butyrate, vinyl acrylate, vinyl phthalate, vinyl maleate, vinyl fumarate, or vinyl oleate, i. e., vinyl esters derived from an organic carboxylic acid having the formula:

$$R_7-COOH$$

Where $R_7$ represents a hydrocarbon radical or a substituted hydrocarbon radical, the substituent being selected from the group consisting of $-Cl, -F, -Br, -NO_2, -OH, -COOH, -COOCH=CH_2$, etc. A preferred group of vinyl esters are those in which $R_7$ is an alkyl group having 2 to 18 carbon atoms. Other organic compounds containing the $$-CH=C\diagdown$$

group may be used in the preparation of my new synthetic resins, however, the above groups of compounds represent a preferred class.

The following examples are given to further characterize my invention:

*Example I.—Condensation of glycerine with β-propionolactone*

15 gms. (0.16 mol.) of glycerine and 36 gms. (0.5 mol.) of β-propionolactone are dissolved in approximately 50 ccs. of dioxane. The resulting solution is then heated for 7 to 8 hours at a temperature of 90 to 95° C., the solution gradually becoming more viscous toward the end of the heating period. The dioxane is then removed by heating under a vacuum, and a colorless, viscous syrup of unusual stability on storage remained. The viscous syrup is then mixed with 0.1% by weight of toluene sulfonic acid and 0.05% benzoyl peroxide. The viscous mixture is then coated on a metal plate and heated at 110–120° C. for two to four hours. A tough, transparent film is produced.

*Example II.—Condensation of β-propionolactone with glycerine monobutyrate*

50 gms. of glycerine monobutyrate (0.3 mol.) are heated to 80 to 90° C., and 50 gms. (0.7 mol.) of β-propionolactone are slowly added over a period of two hours. The mixture is then heated for four hours at 80–90° C. Titanium dioxide pigment (20 gms.), 0.2 gm. of phosphoric acid, and 0.1 gm. of benzoyl peroxide are then added, and the ingredients thoroughly mixed by stirring. The mixture is then coated on metal plates and heated at 115–120° C. for three hours. A tough, white film is produced.

*Example III.—Condensation of β-propionolactone with sorbitol-oleate esters*

Sorbitol is esterified with oleic acid, and a mixture of sorbitol esters consisting essentially of the dioleate and trioleate is attained. Fifty grams of this ester mixture and twenty grams of β-propionolactine are dissolved in 50 cc. of benzene, and the solution refluxed for 6 hours. The benzene is then removed by distillation under vacuum, and a colorless, viscous syrup remained. This syrup is then thoroughly mixed with 0.3% butyl phosphoric acid, 0.1% benzoyl peroxide, and 40 gms. of an alkyd resin obtained by condensing phthalic anhydride with glycerine, and the resulting mixture is coated on a metal plate and heated at 115–125° C. for 3–4 hours. A tough, hard film suitable as a baking enamel is produced.

*Example IV.—Condensation of β-propionolactone with diethylene glycol*

27 gms. of diethylene glycol and 36 gms. of β-propionolactone are dissolved in 50 ccs. of dioxane. The resulting solution is then heated at 90–95 C. for 8 hours, and the dioxane removed by distillation under vacuum. A clear, viscous oil remained. This oil is then mixed with 0.2% toluene sulfonic acid and heated at 120° C. for 1 hour, and a clear, tough resin is formed.

When a solvent of low boiling point is used, it is to be understood that the process described may be carried out at superatmospheric pressure in order to keep the solvent in the liquid phase. Diminished pressures may likewise be used where difficulty is experienced in controlling the heat of reaction.

The following examples will serve to illustrate the copolymers of the β-propionolactone-polyhydric alcohol polymerizate produced in the first heating step of the preceding examples and the unsaturated organic compounds listed above.

*Example V.—Glycerine-β-propionolactone-dibutyl maleate copolymer*

As described in Example I above, 15 gms. (0.16 mol.) of glycerine and 36 gms. (0.5 mol.) of β-propionolactone are dissolved in approximately 50 cc. of dioxane. The resulting solution is then heated for 7 to 8 hours at a temperature of 90 to 95° C., the solution gradually becoming more viscous toward the end of the heating period. The dioxane is then removed by heating under a vacuum, and a colorless, viscous syrup, which may be stored at room temperature for several months, remained. The viscous syrup is then mixed with 0.1% by weight of toluene sulfonic acid and 0.05% by weight of benzoyl peroxide, and 30 gms. of dibutyl maleate added. The clear, viscous solution which was thus obtained is coated on metal plates and heated to a temperature of 120–130° C. for several hours. The resulting product is a clear, colorless, tough film.

*Example VI.—Glycerine-β-propionolactone-diamyl fumarate copolymer*

As described in Example II above, 50 gms. of glycerine monobutyrate (0–3 mols.) are heated to 80 to 90° C., and 50 gms. (0.7 mol.) of β-propionolactone are slowly added with efficient stirring over a period of two hours. The mixture is then heated for four hours at 80 to 90° C. Titanium dioxide pigment (20 gms.), 0.2 gm. of phosphoric acid, and 0.1 gm. of benzyl peroxide are then added to the resulting polymerizate, and 75 gm. of diamyl fumarate are then added with thorough mixing to the mixture thus formed. The mixture is coated on glass plates and then heated at 130 to 135° C. for 2 hours longer. A tough, white film is produced.

*Example VII.—Sorbitol oleates-β-propionolactone polymerizate maleic acid-ethylene glycol polyester copolymer*

As described in Example III above, sorbitol is esterified with oleic acid, and a mixture of sorbitol esters consisting essentially of the dioleate and trioleate is obtained. Fifty grams of this ester mixture and twenty grams of β-propionolactone are dissolved in 50 cc. of benzene, and the solution refluxed for 6 hours. Forty grams of maleic acid ethylene glycol polyester are then added to the benzene solution, and the benzene distilled off under a vacuum. To the mixture thus attained, 0.2% of toluene sulfonic acid, and 0.3% benzoyl peroxide are added. This mixture, after thorough mixing, is coated on a metal plate and heated at 120° C. for 6 hours. A tough, hard film suitable as a baking enamel is produced.

*Example VIII.—Diethylene glycol-β-propionolactone polymerizate-fumaric acid-diethylene glycol polyester copolymer*

As described in Example IV above, 27 gms. of diethylene glycol and 36 gms. of β-propionolactone are dissolved in 50 cc. of dioxane. The resulting solution is heated at 90–95° C. for 8 hours, and then mixed with 50 grams of fumaric acid-diethylene glycol linear polyester. The dioxane is removed by distillation under vacuum, and 0.3% ethyl phosphoric acid 0.4% benzoyl peroxide added with efficient stirring. This mixture is heated for 3 hours at 120° C., a clear resin being formed.

*Example IX.—Diethylene glycol-β-propionolactone polymerizate-ethylene glycol diacrylate copolymer*

The diethylene glycol-β-propionolactone polymerizate used in this example was prepared in identical manner and quantity as given above in Example VIII. To the dioxane solution containing the polymerizate, 40 gms. of ethylene glycol diacrylate are added, and the dioxane evaporated off by distillation under vacuum. To the resulting mixture, 0.3% ethyl phosphoric acid and 0.4% benzoyl peroxide are added. The thoroughly mixed ingredients are then heated at 10–120° C. for 2 hours, and a clear resin is produced.

The resins which may be produced according to the process described herein are useful for forming fillers for incorporation with cellulose ethers and esters to produce new types of plastic materials and protective coatings. They may be further used to impregnate textile materials.

I claim:

1. A resinous condensation product of β-propionolactone and a polyhydric alcohol selected from the group consisting of aliphatic polyhydric alcohols having from 2 to 6 free hydroxyl groups and containing from 2 to 6 carbon atoms; aliphatic monocarboxylic acid esters of aliphatic polyhydric alcohols, said ester having from 2 to 5 free hydroxyl groups, the monocarboxylic acid radical containing from 2 to 18 carbon atoms; alkyl ethers of aliphatic polyhydric alcohols, said ether having from 2 to 5 free hydroxyl groups, the alkyl group containing from 1 to 4 carbon atoms; and alkyl ether-aliphatic monocarboxylic acid esters of aliphatic polyhydric alcohols, said ether-ester having from 2 to 4 free hydroxyl groups, the alkyl group containing from 1 to 4 carbon atoms and the monocarboxylic acid radical containing from 2 to 18 carbon atoms, said β-propionolactone being used in a mol. ratio of 0.5 to 1.5 mols. for each free hydroxyl group of the polyhydric alcohol.

2. A resinous condensation product of β-propionolactone and an aliphatic polyhydric alcohol having 2 to 6 free hydroxyl groups and containing from 2 to 6 carbon atoms said β-lactone being used in a mol. ratio of 0.5 to 1.5 mols. for each free hydroxyl group of the polyhydric alcohol.

3. A resinous condensation product of β-propionolactone and an aliphatic monocarboxylic acid ester of an aliphatic polyhydric alcohol, said ester having from 2 to 5 free hydroxyl groups, the monocarboxylic acid radical containing from 2 to 18 carbon atoms, said β-propionolactone being used in a mol. ratio of 0.5 to 1.5 mols. for each free hydroxyl group of the ester of the polyhydric alcohol.

4. A resinous condensation product attained by condensing substantially 2 to 3 mols. of β-propionolactone with substantially 1 mol. of glycerine.

5. A resinous condensation product of substantially 2 mols. of β-propionolactone and 1 mol. of glycerine monobutyrate.

6. A resinous condensation product of substantially 1 to 2 mols. of β-propionolactone and 1 mol. of diethylene glycol.

7. A resinous condensation product of 3 mols. of β-propionolactone and 1 mol. of glycerol.

8. A resinous condensation product of 2 mols. of β-propionolactone and 1 mol. of diethylene glycol.

9. A resinous condensation product of 1 to 3 molecular proportions of β-propionolactone and 1 molecular proportion of an aliphatic polyhydric alcohol having from 2 to 3 hydroxyl groups and containing from 2 to 4 carbon atoms.

10. A process for making synthetic resins which comprises condensing a polyhydric alcohol selected from the group consisting of aliphatic polyhydric alcohols having from 2 to 6 free hydroxyl groups and containing from 2 to 6 carbon atoms; aliphatic monocarboxylic acid esters of aliphatic polyhydric alcohols, said ester having from 2 to 5 free hydroxyl groups, the monocarboxylic acid radical containing from 2 to 18 carbon atoms; alkyl ethers of aliphatic polyhydric alcohols, said ether having from 2 to 5 free hydroxyl groups, the alkyl group containing from 1 to 4 carbon atoms; and alkyl ether-aliphatic monocarboxylic acid esters of aliphatic polyhydric alcohols, said ether-ester having from 2 to 4 free hydroxyl groups, the alkyl group containing from 1 to 4 carbon atoms and the monocarboxylic acid radical containing from 2 to 18 carbon atoms, with 0.5 to 1.5 molecular proportions of β-propionolactone, for each free hydroxyl group of the polyhydric alcohol, at a temperature of 70–100° C., thereafter adding a strong acid selected from the group consisting of sulfuric, phosphoric, perchloric, toluene sulfonic, and alkyl phosphoric acids, and continuing heating until the reaction product is converted into a tough, infusible resin.

11. A process for making synthetic resins which comprises condensing an aliphatic polyhydric alcohol having from 2 to 6 free hydroxyl groups and containing from 2 to 6 carbon atoms, with 0.5 to 1.5 molecular proportions of β-propionolactone for each free hydroxyl group of the polyhydric alcohol, at a temperature of 70–100° C. thereafter adding a strong acid selected from the group consisting of sulfuric, phosphoric, perchloric, toluene sulfonic, and alkyl phosphoric acids, and continuing heating until the reaction product is converted into a tough, infusible resin.

12. A process for making synthetic resins which comprises condensing an aliphatic monocarboxylic acid ester of an aliphatic polyhydric alcohol, said ester having 2 to 5 free hydroxyl groups, the monocarboxylic acid radical containing from 2 to 18 carbon atoms, with 0.5 to 1.5 molecular proportions of $\beta$-propionolactone for each free hydroxyl group of the polyhydric alcohol, at a temperature of 70–100° C. thereafter adding a strong acid selected from the group consisting of sulfuric, phosphoric, perchloric, toluene sulfonic, and alkylphosphoric acids, and continuing heating until the reaction product is converted into a tough, infusible resin.

13. A process for making a new synthetic resin which comprises heating an aliphatic polyhydric alcohol having 2 to 6 free hydroxyl groups and containing from 2 to 6 carbon atoms and substantially 0.5 to 1.5 mols., based on the available hydroxyl groups of the polyhydric alcohol, of $\beta$-propionolactone at a temperature of 70 to 100° C., thereafter adding 0.1–0.4% by weight of a strong acid selected from the group consisting of sulfuric, phosphoric, perchloric, toluene sulfonic, and alkyl phosphoric acids and continuing heating at a temperature of 110–170° C. until the mixture is converted into a tough, infusible resin.

14. A process for making a synthetic resin which comprises heating at a temperature of 70–100° C. a solution of 2 to 3 mols. of $\beta$-propionolactone, 1 mol. of glycerine, and a solvent selected from the group consisting of dioxane, benzene, toluene, and diisopropyl ether, thereafter evaporating off the solvent under a vacuum, adding 0.1–0.4% by weight of an acid selected from the group consisting of sulfuric, phosphoric, perchloric, toluene sulfonic, and alkyl phosphoric acids and 0.05–0.1% by weight of a polymerization catalyst, and continuing the heating at a temperature of 110–170° C. until the mixture is converted into a tough, infusible resin.

15. A resinous polymer of a condensate of $\beta$-propionolactone and a polyhydric alcohol selected from the group consisting of aliphatic polyhydric alcohols having from 2 to 6 free hydroxyl groups and containing from 2 to 6 carbon atoms; aliphatic monocarboxylic acid esters of aliphatic polyhydric alcohols, said ester having from 2 to 5 free hydroxyl groups, the monocarboxylic acid radical containing from 2 to 18 carbon atoms; alkyl ethers of aliphatic polyhydric alcohols, said ether having from 2 to 5 free hydroxyl groups, the alkyl group containing from 1 to 4 carbon atoms; and alkyl ether-aliphatic monocarboxylic acid esters of aliphatic polyhydric alcohols, said ether-ester having from 2 to 4 free hydroxyl groups, the alkyl group containing from 1 to 4 carbon atoms and the monocarboxylic acid radical containing from 2 to 18 carbon atoms, said condensate resulting from a condensation of said polyhydric alcohol with 0.5 to 1.5 molecular proportions of $\beta$-propionolactone for each free hydroxyl group of the polyhydric alcohol.

JOHN R. CALDWELL.

No references cited.